Aug. 24, 1965 R. E. LINKER 3,201,818
WINDSHIELD WIPER AND METHOD OF PRODUCING THE SAME
Filed May 12, 1964 2 Sheets-Sheet 1

ROY E. LINKER
INVENTOR.

BY *Albert Sperry*
ATTORNEY

Aug. 24, 1965  R. E. LINKER  3,201,818
WINDSHIELD WIPER AND METHOD OF PRODUCING THE SAME
Filed May 12, 1964  2 Sheets-Sheet 2

ROY E. LINKER
INVENTOR.

BY Albert Sperry.

ATTORNEY

United States Patent Office 3,201,818
Patented Aug. 24, 1965

3,201,818
WINDSHIELD WIPER AND METHOD OF
PRODUCING THE SAME
Roy E. Linker, Nursery Road, P.O. Box 124,
West Trenton, N.J.
Filed May 12, 1964, Ser. No. 366,697
6 Claims. (Cl. 15—250.06)

This invention relates to windshield wiper blades and methods of producing the same. The invention is directed particularly to windshield wiper blades which embody a heating element to melt ice or snow which may be on the windshield or which may build up on the wiper blade as it sweeps back and forth in contact with the windshield.

It has been suggested heretofore that heating elements might be applied to the holder by which a windshield wiper blade is supported. However, such constructions have been relatively complicated and expensive and have not generally proven satisfactory. Various types of windshield wiper blades to which heating elements are applied have been suggested, but they generally tend to stiffen the wiper blade and limit the flexing thereof so as to impair its wiping action.

All such heated windshield wipers have also been limited in their application in that they must be specially designed and made in a multitude of different lengths and shapes for application to different sizes and styles of windshield. Furthermore, since the wiper blade is repeatedly tilted and flexed to different angular positions with respect to the windshield and holder as it oscillates back and forth across the surface of the windshield, the electrical connection between the heating element and the electrical conductors to which it is connected are subjected to such continued bending and strains that they tend to break or become disconnected during use. Such constant movements also tend to cause the heating element and blade to be displaced relative to each other or to separate and fall apart during operation of the wiper.

In accordance with the present invention, these objections and limitations inherent in heated windshield wipers of the prior art are overcome and a new type of windshield wiper blade is provided which is inexpensive to produce and capable of application to substantially any length, size or type of windshield wiper blade holder and for use on any type of windshield. The manner in which the wiper blade is produced also serves to eliminate the usual electrical connections between the blade and electrical conductors and renders it possible to produce a heated wiper blade of any length from a continuous uniform strip of material wherein a flexible plastic composition is extruded onto and about a heating element so as to provide an integral unit of any desired length and cross-section.

Accordingly, the principal objects of the present invention are to provide a novel type of windshield wiper blade embodying a heating element, to provide novel methods for producing windshield wiper blades adapted to be heated, and to provide a novel type of wiper blade unit adapted to be applied to substantially any blade holding element of a windshield wiper assembly.

These and other objects and features of the present invention will appear from the following description thereof wherein reference is made to the figures of the accompanying drawing.

Figure 1:
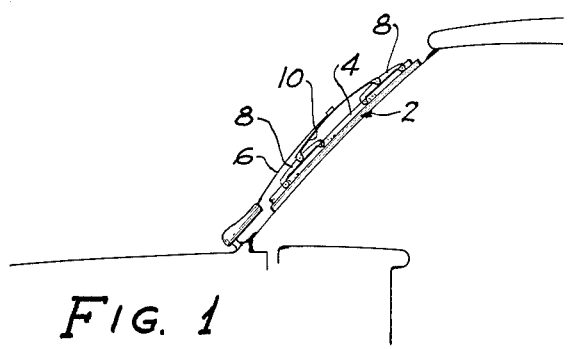
FIG. 1 is a side view illustrating a typical windshield wiper assembly embodying the present invention.

In that form of the invention chosen for purposes of illustration in the drawings, the wiper blade 2 is designed to be applied to any suitable or preferred type or size of blade holder 4 carried by an actuating arm 6 which may be driven by a motor or any other suitable or preferred means (not shown). The blade holder illustrated is formed of metal and has mounting blocks 8 carried thereby between which a flexible metal strip 10 extends. An attaching element 12 is secured to the strip 10 for attaching the wiper blade holder and blade to the actuating arm 6 of the windshield wiper. The blade holder 4 illustrated is formed with a slot or groove 14 therein which extends lengthwise of the holder so that the wiper blade 2 may be inserted and removed by slipping it lengthwise into and out of the holder. However, the holder may be otherwise formed for receiving and holding the wiper blade in place and the holder, attaching means and other elements of the windshield wiper may be of any desired or preferred form and construction.

Figure 5:
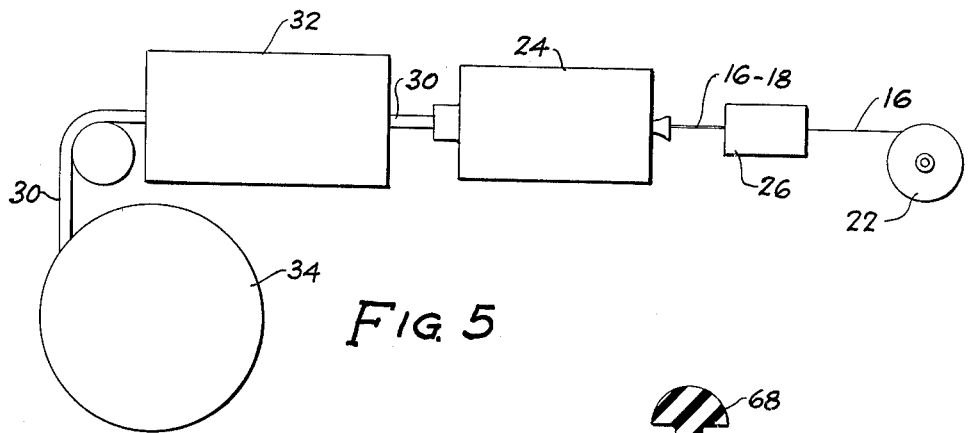
FIG. 5 is a diagrammatic illustration of typical equipment which may be employed in producing heated windshield wiper blades in accordance with the present invention.

In accordance with the present invention, the wiper blade 2 is formed by an extrusion process and embodies a heating element 16 provided with an electrically insulating covering 18 and is embedded in and integrally bonded to flexible plastic material 20 such as rubber, neoprene or the like which serves as the wiping element of the blade. The wiper blade forming material may be produced by any conventional equipment and process. As shown diagrammatically in FIG. 5, a heating element in the form of an electrical resistance conductor made of a nickel-chromium alloy or the like is supplied from a reel 22 and is passed to the extrusion device 24. The resistance element may be previously provided with suitable insulation 18 or the insulation may be applied as an incident to the formation of the wiper blade material by passage through a wrapping, coating or other insulation applying device 26. The insulated element in passing through the extrusion device 24 is properly located or centered with respect to a forming die 28 so that the strip of wiper blade forming material 30 issuing from the extrusion device will have the insulated heating element 16 properly positioned within the strip.

The outer surface of the insulation 18 on the heating element is preferably somewhat rough, irregular or fibrous and in passing through the die of the extrusion device, the plastic composition employed is subjected to relatively great pressure so as to be forced into intimate and permanent contact with the insulation. In this way, a strong and permanent bond is established between the plastic composition and the heating element and its insulation. As a result, slippage or relative longitudinal movement of the heating element and the plastic material of the blade cannot occur despite the fact that the plastic composition of the blade may be of a soft and yielding character and the heating element maintained at a high temperature during use.

The product thus obtained may pass through a curing chamber 32, if desired, and thereafter be wound up on a reel as shown at 34 or otherwise handled for storage or supply to manufacturers or users. If desired, the strip of wiper blade forming material may in the alternative be cut into whatever lengths are desired by wholesalers, retailers, garages or individuals for use in producing windshield wiper blades of any required length.

Figure 3:
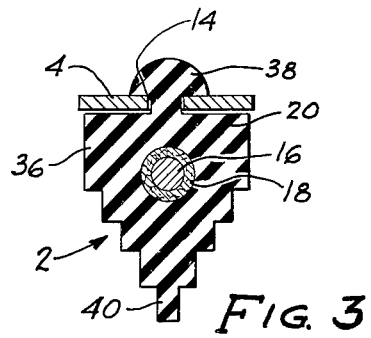
FIG. 3 is a transverse sectional view of the wiper blade and holder illustrated in FIG. 2 taken on the line 3—3 thereof.

The wiper blade forming material thus produced may be of any desired shape in cross-section and different types of wiper blades may be formed by employing differently shaped dies 28 in forming the strip 30 of wiper blade forming material. However, as shown in FIG. 3, the wiper blade preferably has a body or enlarged portion 36 with the insulated heating element 16 centered or properly located therein and extending throughout the length of the strip. The strip further is provided with a rib or bead 38 extending longitudinally of the strip along one edge thereof and of a suitable shape in cross-section to be received and held within the slot or groove 14 of the wiper blade holder 4. The opposite edge 40 of the body 36 of the strip is preferably tapered or relatively narrow and flexible for engagement with the surface of the windshield and to provide the desired squeegee or cleaning action as it moves over the windshield during the wiping operation.

Figure 6:
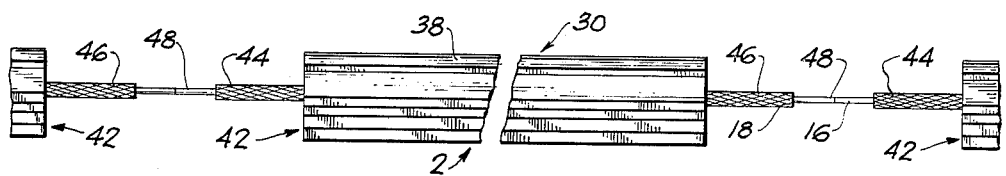
FIG. 6 is a side elevation of a strip of windshield wiper blade material embodying the present invention indicating how windshield wiper blades may be produced therefrom.

The strip of windshield wiper blade material thus provided may be employed for producing windshield wiper blades of any desired length at will and as required by the garage or service station or any manufacturer and for use on conventional wiper blade holders on any make or style of automobile. For this purpose, a length of the strip 30 exceeding the required length of the wiper blade by, say, 4 to 6 inches, is severed from a roll or supply of the extruded strip of material as shown in FIG. 6 to form a wiper blade unit. The flexible plastic material surrounding the insulated heating element is then cut away or removed from the insulated element leaving it exposed and projecting beyond the ends of the wiper blade portion 42 of the unit to form leads 44 and 46. The extremities of the leads 44 and 46 then may be stripped of their insulation for a short distance as indicated at 48.

Figure 2:
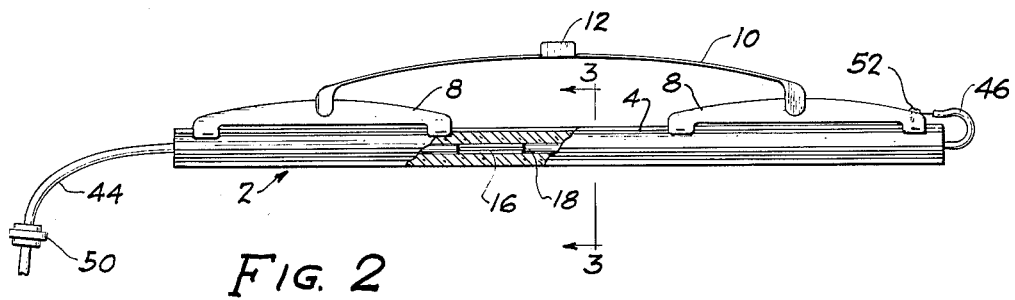
FIG. 2 is an enlarged side elevation of the wiper blade and holder illustrated in FIG. 1.
Figure 4:
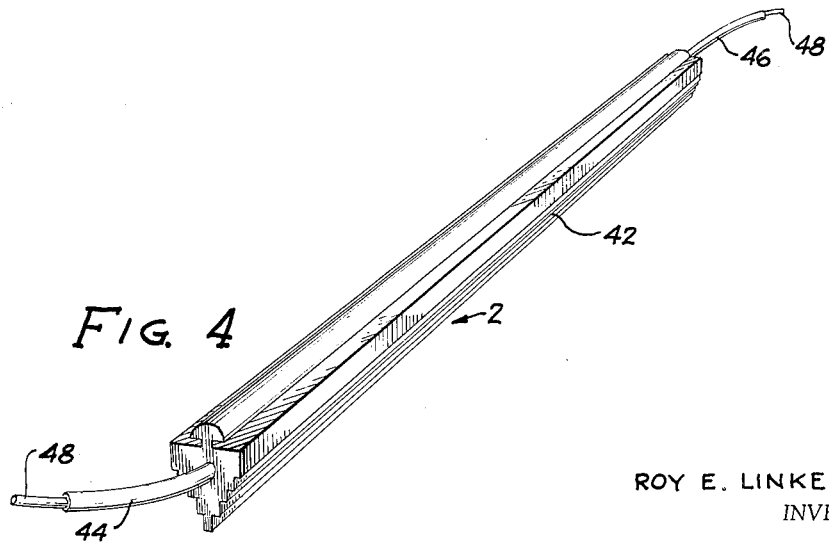
FIG. 4 is a perspective illustrating a typical wiper blade unit embodying the present invention.

If desired, the stripped ends 48 of the wiper blade unit can be fastened to the wiper blade holder 4 or its mounting block 8 and to a conductor (not shown) connected to a suitable source of current for energizing the heating element. However, it is generally preferable to apply a conventional plug, jack or connector 50 to the lead 44 on one end of the wiper blade unit as shown in FIG. 2 for removable connection with a complementary connection on the car, truck or other vehicle to supply current to the heating element. In a like manner, a connector 52 may be applied to the lead 46 at the opposite end of the unit for attachment to the metal blade holder 4 or the block 8 of the windshield wiper assembly. The lead 46 may in the alternative be left bare and attached to the blade holder 4 or mounting block by a screw or the like, if desired.

The wiper blade thus provided can then be heated when desired by passing current through a switch (not shown) to the heating element 16 and from the element 16 to the blade holder 4 and the ground, or current may be supplied to the heating element in any other manner desired. In any event, the length of the windshield wiper blade 42, the length of the leads 44 and 46 and the type of the connectors 50 and 52 can be selected and varied as will at the time the wiper blade is to be installed in the windshield wiper assembly. On the other hand, the wiper blade units can be made up in standard, conventional or acceptable lengths with the connectors applied thereto by a manufacturer, service station, or others if desired.

Figure 7:
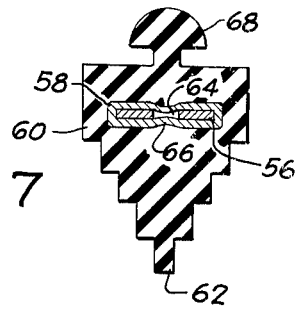
FIG. 7 is a transverse sectional view of an alternative form of windshield wiper blade embodying the present invention.

In the alternative form of the invention shown in FIG. 7, the heating element is in the form of a flat wire or strip 56 formed of resistance material and of greater width than thickness. The resistance element is provided with insulation 58 and is positioned within the body 60 of the extruded flexible plastic material at right angles to the plane in which the wiping edge 62 of the blade is located. In this way, the heating element is capable of flexing readily with the strip in a direction to insure proper engagement of the wiping edge 62 with the windshield but serves to stiffen and oppose undesired transverse bending of the blade when in use.

The flat resistance element 56 may, if desired, be formed with openings or holes 64 at spaced intervals throughout the length thereof whereby the insulation 58 will be depressed adjacent the holes 64 as shown at 66 in FIG. 7 under the pressure applied thereto during the extrusion operation. As a result, the plastic material used in forming the wiper blade will be even more effectively bonded to the heating element as an incident to the operation of producing the wiper blade forming material.

Figure 8:
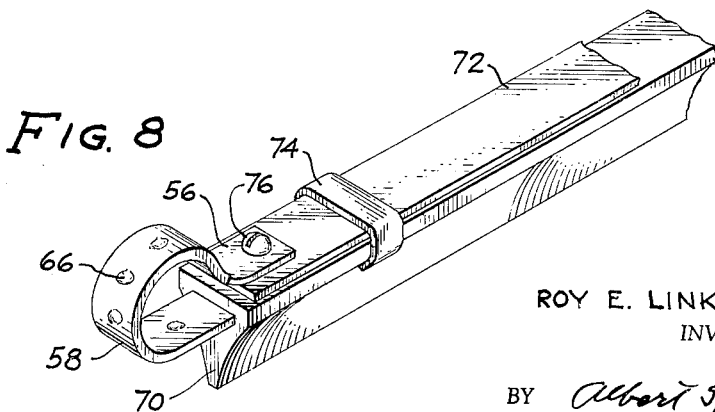
FIG. 8 is a perspective illustrating a further alternative form of wiper blade and holder embodying the present invention.

Wiper blades embodying a flat form of heating element may have any desired shape in cross-section. As shown in FIG. 7, the blade has a rib or bead 68 extending along the attaching edge thereof, opposite to the wiping edge 62, for engagement with a standard and conventional type of blade holder illustrated in FIG. 3. However, as shown, by way of example in FIG. 8, the wiper blade 70 may have any other and generally tapered form. Moreover, if the blade holder 72 is provided with clips, clamps or other gripping means 74 designed to embrace the sides of the wiper blade body, it is not necessary to provide the blade or blade forming material with a bead or blade attaching means. FIG. 8 also serves to show the use of a screw 76 passing through one of the anchoring holes 64 in the heating element 56 for electrically connecting the heating element to the blade holder.

The wiper blades thus provided are characterized by the fact that the plastic composition of which the wiping element is formed is fixedly and permanently bonded to the insulated heating element whereas the leads by which the wiper blade is connected to an electrical circuit for energizing the heating element are integral with the heating element itself so that there is no danger or possibility of their being broken or disconnected from the heating element. Moreover, the bonding of the plastic material to the insulated heating element is effected as an incident to the formation of the wiping element as it is passed through the die of the extrusion device so that there is no possibility of the plastic material becoming displaced with respect to the heating element during use. At the same time, the wiper blade possesses the necessary flexibility to permit it to be applied to curved windshields and to follow the contour thereof under the action of the spring strip 10 or other means serving to urge the blade toward the surface of the windhsield engaged thereby.

It will be apparent from the foregoing description that the length and the cross-sectional form of windshield wiper blades embodying the present invention, the length of the lead wires and the form and type of the connectors (if any) applied thereto are capable of great variation and flexibility of application to permit the use thereof on substantially any and all types of windshield wiper assemblies. Moreover, while the particular windshield blade described has only a single heating element embodied therein, it is possible to employ a heating element composed of a plurality of strands of insulated wire and to employ a plurality of spaced heating elements within the extruded strip of windshield wiper blade forming material.

In view thereof, it should be understood that the particular form and construction of the windshield wiper blade and the method of producing the same which have been shown in the drawing and described above are in-

I claim:

1. The method of producing a windshield wiper blade which comprises the steps of extruding a flexible plastic material onto and about a flexible insulated heating element formed of a resistance alloy, thereafter severing the resulting strip into lengths exceeding the length of a windshield wiper blade to be produced, removing the plastic material from the insulated heating element at the opposite ends of the severed lengths of the strip thus produced to provide insulated electrical leads, and stripping the insulation from a portion of the leads thus provided for connecting the wire to a source of electrical current.

2. The method as defined in claim 1 wherein connectors are applied to the ends of the leads which have been stripped of insulation.

3. A flexible windshield wiper blade adapted for use in wiping a curved windshield comprising a strip of flexible plastic material having a heating element embedded in the plastic material and intimately and permanently bonded to the plastic material, said strip being of uniform cross section throughout the length thereof and having opposite edges with means extending longitudinally of the strip adjacent one of said edges for mounting the blade in a holder, the opposite edge of the strip being tapered for flexible wiping engagement with a windshield, the heating element having a width greater than its thickness and being arranged in the strip with its width at right angles to a plane including said edges of the strip and serving to render the wiper blade flexible in said plane to conform to the curvature of a windshield while opposing transverse bending of the windshield wiper blade, the ends of said heating element projecting beyond the ends of the blade for connection to a source of electrical current.

4. A windshield wiper blade as defined in claim 3 wherein the heating element has openings therein spaced apart lengthwise of the element and said plastic material projects into said openings in a manner to aid in holding the plastic material and heating element in fixed relative positions.

5. The method of producing a windshield wiper blade of predetermined length which is adapted to be electrically heated, which comprises the steps of extruding a flexible plastic material onto and about a flexible heating element formed of a resistance alloy, thereafter severing the resulting strip into lengths exceeding the predetermined length of the windshield wiper blade to be produced, and removing the plastic material from the heating element at opposite ends of the strip to expose the heating element for connection to a source of electrical current while leaving the plastic material in its extruded position about the heating element for said predetermined length between the exposed ends of the heating element.

6. The method of producing a windshield wiper blade which is adapted to be electrically heated and which has a wiping edge extending longitudinally of the blade, which comprises the steps of extruding a flexible plastic material onto and about a flat strip formed of a resistance alloy in a manner to locate said flat strip in a position extending lengthwise of the wiper blade but spaced from and transverse with respect to the wiping edge of the blade, severing the resulting extruded material into lengths exceeding the length of the wiper blade to be produced, and stripping the plastic material from the strip at opposite ends of the severed lengths to expose the strip for connection to a source of electrical current for heating the wiper blade.

References Cited by the Examiner

UNITED STATES PATENTS

| 2,194,671 | 3/40 | Pauro | 15—250.06 |
| 2,302,780 | 11/42 | Le Clair | 15—250.06 |
| 2,656,448 | 10/53 | Lentz | 15—250.06 |
| 2,697,241 | 12/54 | Qishei | 15—250.42 |

CHARLES A. WILLMUTH, *Primary Examiner.*